United States Patent
Wu et al.

(10) Patent No.: US 11,954,200 B2
(45) Date of Patent: Apr. 9, 2024

(54) CONTROL INFORMATION PROCESSING METHOD AND APPARATUS, ELECTRONIC DEVICE, AND STORAGE MEDIUM

(71) Applicant: TENCENT TECHNOLOGY (SHENZHEN) COMPANY LIMITED, Shenzhen (CN)

(72) Inventors: Haijun Wu, Shenzhen (CN); Jietao Wu, Shenzhen (CN); Wenfei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 527 days.

(21) Appl. No.: 17/206,063

(22) Filed: Mar. 18, 2021

(65) Prior Publication Data
US 2021/0200861 A1    Jul. 1, 2021

Related U.S. Application Data

(63) Continuation of application No. PCT/CN2019/120962, filed on Nov. 26, 2019.

(30) Foreign Application Priority Data

Dec. 20, 2018   (CN) .......................... 201811565846.4

(51) Int. Cl.
*G06F 21/54*        (2013.01)
*A63F 13/40*        (2014.01)
(Continued)

(52) U.S. Cl.
CPC .............. *G06F 21/54* (2013.01); *A63F 13/40* (2014.09); *A63F 13/73* (2014.09); *A63F 13/79* (2014.09);
(Continued)

(58) Field of Classification Search
CPC .... G06F 21/54; G06F 2221/035; A63F 13/40; A63F 13/73; A63F 13/79; A63F 13/2145;
(Continued)

(56) References Cited

U.S. PATENT DOCUMENTS

| 2014/0329593 A1 | 11/2014 | Akkarakaran |
| 2016/0193530 A1 | 7/2016 | Parker et al. |
| 2018/0311574 A1 | 11/2018 | Kawahara et al. |

FOREIGN PATENT DOCUMENTS

| CN | 103157282 A | 6/2013 |
| CN | 103272382 A | 9/2013 |

(Continued)

OTHER PUBLICATIONS

The State Intellectual Property Office of the People's Republic of China (SIPO) Office Action 2 for for 201811565846.4 dated Aug. 4, 2006, 2021 10 Pages (including translation).

(Continued)

*Primary Examiner* — Brian F Shaw
(74) *Attorney, Agent, or Firm* — ANOVA LAW GROUP, PLLC

(57) ABSTRACT

A control information processing method is provided. The method includes: simulating a controller on a first device based on a target drive file of the first device; receiving control information sent by a second device, the control information being used for controlling the first device to perform a corresponding operation; storing the control information as input information of the controller into a storage space of the target drive file; and obtaining the control information from the storage space of the target drive file in response to receiving a data read instruction that instructs to obtain the input information of the controller.

20 Claims, 10 Drawing Sheets

(51) Int. Cl.
*A63F 13/73* (2014.01)
*A63F 13/79* (2014.01)

(52) U.S. Cl.
CPC . *A63F 2300/201* (2013.01); *A63F 2300/5546* (2013.01); *A63F 2300/60* (2013.01); *G06F 2221/032* (2013.01)

(58) Field of Classification Search
CPC ........ A63F 13/355; A63F 13/42; A63F 13/92; A63F 2300/201; A63F 2300/5546; A63F 2300/60
See application file for complete search history.

(56) References Cited

FOREIGN PATENT DOCUMENTS

| CN | 103480153 A | 1/2014 |
|---|---|---|
| CN | 103686289 A | 3/2014 |
| CN | 105451046 A | 3/2016 |
| CN | 108052377 A | 5/2018 |
| CN | 108693997 A | 10/2018 |
| CN | 109646944 A | 4/2019 |

OTHER PUBLICATIONS

The European Patent Office (EPO) The Extended European Search Report for 19898642.4 dated Oct. 8, 2021 10 Pages.
Anonymous: "DroidPad: PC Joystick & mouse—Android Apps on Google Play," Google Play, Dec. 19, 2017 (Dec. 19, 2017), Retrieved from the Internet: URL: https://web.archive.org/web/20171219094522/https://play.google.com/store/apps/details?id=uk.digitalsquid.droidpad&hl=en, [retrieved on Sep. 20, 2021]. 3 pages.
Anonymous: "OnLive," Wikipedia.com, Oct. 5, 2018 (Oct. 5, 2018), Retrieved from the Internet: URL: https://en.wikipedia.org/w/index.php?title=OnLive&oldid=862644981, [retrieved on Sep. 12, 2021]. 12 pages.
Anonymous: "Remote desktop software," Wikipedia.com, Jul. 30, 2018 (Jul. 31, 2018), Retrieved from the Internet: URL: https://en.wikipedia.org/w/index.php?title=Remote_desktop_software&oldid=852668207, [retrieved on Sep. 12, 2021]. 3 pages.
The World Intellectual Property Organization (WIPO) International Search Report for PCT/CN2019/120962 dated Mar. 4, 2020 6 Pages (including translation).
The State Intellectual Property Office of the People's Republic of China (SIPO) Office Action 1 for 201811565846.4 dated Feb. 20, 2021 9 Pages (including translation).
Baidu experience, "Game streaming tutorial Graphic tutorial", Jul. 25, 2017, Retrieved from the Internet: https://jingyan.baidu.com/article/c74d6000be410c0f6a595dbe.html. 13 pages.

CONTROL INFORMATION PROCESSING METHOD AND APPARATUS, ELECTRONIC DEVICE, AND STORAGE MEDIUM

CROSS-REFERENCES TO RELATED APPLICATIONS

This application is a continuation application of PCT Patent Application No. PCT/CN2019/120962, filed on Nov. 26, 2019, which claims priority to Chinese Patent Application No. 201811565846.4, entitled "CONTROL INFORMATION PROCESSING METHOD AND APPARATUS, ELECTRONIC DEVICE, AND STORAGE MEDIUM" and filed with the China National Intellectual Property Administration on Dec. 20, 2018, both of which are incorporated herein by reference in their entirety.

FIELD OF THE TECHNOLOGY

The present disclosure relates to the field of Internet technologies, and in particular, to a control information processing method and apparatus, an electronic device, and a storage medium.

BACKGROUND OF THE DISCLOSURE

With the development of Internet technologies, playing games on terminals has become relatively common. In many scenarios, a fixed terminal runs a game application, and a user performs a control operation on a mobile terminal. Generally, during a game, the fixed terminal synchronizes game screen data to the mobile terminal, and the mobile terminal synchronously displays a game screen of the game. The user performs a control operation on the mobile terminal, for example, controls a virtual object in the game to jump. The mobile terminal then synchronizes operation data of the control operation to the fixed terminal, to realize control of a game application on the fixed terminal based on the control operation on the mobile terminal.

The fixed terminal alters execution logic of the game by using a hook API technology, to realize control of a game application on the fixed terminal based on the control operation on the mobile terminal. Specifically, execution logic of invoking a device enumeration interface and a device data read interface in the game application is altered. The device enumeration interface is configured to enumerate all input devices on the fixed terminal, and the device data read interface is configured to read information inputted by all the input devices.

In the related technology, the fixed terminal starts the game application, and first alters execution logic of invoking the device enumeration interface in the game application. Specifically, during invoking of the device enumeration interface, handle information of a game handle is added to device information of all external devices enumerated by the device enumeration interface. The fixed terminal invokes the device enumeration interface to obtain the handle information. The fixed terminal displays a target object on a current interface, and the mobile terminal sends display information to the fixed terminal in real time. The display information is used for indicating a change manner of the target object displayed on the mobile terminal. The fixed terminal alters execution logic of invoking the device data read interface in the game application. Specifically, during invoking of the device data read interface, a target address is added to the execution logic of the device data read interface. Then, the fixed terminal stores the display information at the target address. When invoking the device data read interface, the fixed terminal obtains the display information at the target address. The fixed terminal displays the target object according to the display information.

In the foregoing process, program execution logic of the game needs to be altered to realize an operation control process. However, many terminals are provided with protection programs. The protection program can protect the execution logic of the game from being altered. Consequently, the foregoing process may be interrupted during execution, resulting in poor stability of the foregoing process.

SUMMARY

According to various embodiments provided in the present disclosure, a control information processing method and apparatus, an electronic device, and a storage medium are provided.

A control information processing method is provided, performed by a first device, and including: simulating a controller on a first device based on a target drive file of the first device; receiving control information sent by a second device, the control information being used for controlling the first device to perform a corresponding operation; storing the control information as input information of the controller into a storage space of the target drive file; and obtaining the control information from the storage space of the target drive file in response to receiving a data read instruction that instructs to obtain the input information of the controller.

An electronic device is provided, including a processor and a memory, the memory storing computer-readable instructions, the computer-readable instructions, when executed by the processor, causing the processor to perform a plurality of operations. The operations include: simulating a controller on a first device based on a target drive file of the first device; receiving control information sent by a second device, the control information being used for controlling the first device to perform a corresponding operation; storing the control information as input information of the controller into a storage space of the target drive file; and obtaining the control information from the storage space of the target drive file in response to receiving a data read instruction that instructs to obtain the input information of the controller.

A non-transitory storage medium storing computer-readable instructions is provided, the computer-readable instructions, when executed by one or more processors, causing the one or more processors to perform a plurality of operations. The operations include: simulating a controller on a first device based on a target drive file of the first device; receiving control information sent by a second device, the control information being used for controlling the first device to perform a corresponding operation; storing the control information as input information of the controller into a storage space of the target drive file; and obtaining the control information from the storage space of the target drive file in response to receiving a data read instruction that instructs to obtain the input information of the controller.

Details of one or more embodiments of the present disclosure are provided in the accompanying drawings and descriptions below. Other features, objectives, and advantages of the present disclosure become apparent from the specification, the accompanying drawings, and the claims.

BRIEF DESCRIPTION OF THE DRAWINGS

To describe the technical solutions of the embodiments of the present disclosure more clearly, the following briefly describes the accompanying drawings required for describing the embodiments. Apparently, the accompanying drawings in the following description show only some embodiments of the present disclosure, and a person of ordinary skill in the art may still derive other accompanying drawings according to the accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

Figure 1:
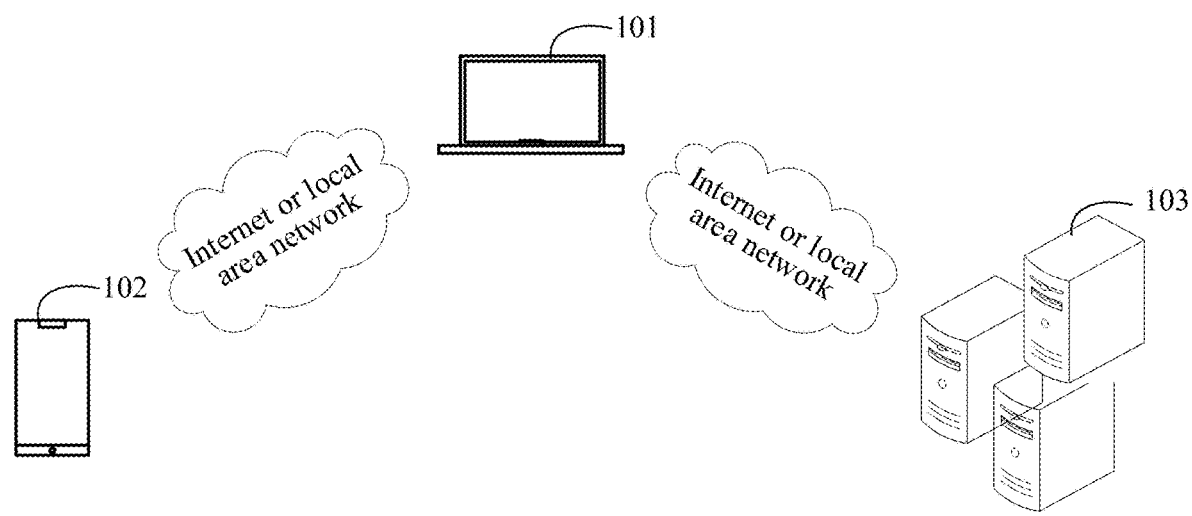
FIG. 1 is a schematic diagram of an implementation environment according to embodiments of the present disclosure.

FIG. 1 is a schematic diagram of an implementation environment according to the embodiments of the present disclosure. Referring to FIG. 1, the implementation environment includes: a first device 101 and a second device 102. A management application is installed on each of the first device 101 and the second device 102. The first device 101 and the second device 102 may exchange data based on the management application.

The management application includes a start portal for a plurality of applications, and the first device 101 may start any application based on the start portal. The management application has a streaming function. The streaming function refers to a function of data synchronization between a plurality of devices. After the first device 101 and the second device 102 establish a connection based on the management application, the second device 102 sends control information to the first device 101 based on an operation control displayed on the second device 102. A target drive file is configured on the first device 101. The first device 101 may simulate a controller on the first device 101 through the target drive file based on execution logic of the management application, and store the control information of the second device 102 as input information of the controller based on the target drive file, so that when running any application in the management application, the first device 101 can read the control information based on read logic of reading the input information of the controller, and execute processing logic of the application based on the control information. The first device 101 may further synchronize multimedia data displayed on the first device 101 to the second device 102 based on the streaming function of the management application, to realize synchronous display of the multimedia data on the first device 101 and the second device 102.

In a possible scenario, the management application may be a game management application, the plurality of applications may be game applications in the game management application, and the game management application may provide a start portal for a plurality of game applications. The second device 102 may be a mobile terminal, and the first device 101 may be a fixed terminal. A user may trigger any game application on an application interface of the game management application of the second device 102. The second device 102 triggers, based on the streaming function, the first device 101 to run the game application triggered by the user. The first device 101 synchronizes data generated during running of the game application to the second device 102 based on the streaming function of the game management application.

A UI may be displayed on the second device 102. The UI includes a control area and a game screen displayed based on multimedia data. The control area includes at least one operation control. The user may trigger display of an operation control on the second device, to control a game application on the first device 101. The second device 102 sends control information corresponding to the operation control triggered by the user to the first device 101.

A target drive file runs on the first device 101. The first device 101 may simulate a controller in an operating system of the first device 101 based on the target drive file. Simulating a controller, as used herein, may refer to create/add a virtual controller to the operating system as if the operating system is connected to a physical controller (e.g., a physical gamepad/joystick controller such as Xbox controller, PS4 controller, remote controller). After the simulation of the virtual controller is completed, the controller is added to a device manager of the operating system and is recognized/managed by the device manager as an input/output (I/O) device. Examples of other I/O devices recognized/managed by the device manager may include, for example, a mouse, a keyboard, a physical game controller, etc. The first device 101 stores the control information of the second device 102 as the input information of the controller into a storage space of the target drive file. The first device 101 reads the control information of the first device 101 from the storage space of the target drive file based on data read logic of the game application. The data read logic is used for indicating a process of reading the input information of the controller. The first device 101 executes execution logic of the game application based on the control information. Moreover, the first device 101 may further synchronize a game screen during running of the game application to the second device 102, to realize synchronous display on the second device 102 and the first device 101. It can also be understood that, after successful simulation of the controller in the operating system of the first device 101, the communication between the first device 101 and the second device 102 are two-way communication. That is, the input information of the controller can be received and processed by the first device 101, and output information of the first device 101 can also be received and processed by the second device 102. The two-way communication can be implemented in a similar manner to a two-way communication between a computing device and a physical controller.

The implementation environment may further include a server 103. The server 103 may be a backend server of the management application. The second device 102 and the first device 101 exchange data based on the server 103. In addition, when the first device 101 is running the game application, the first device 101 may exchange data with a backend server of the game application, to obtain game data of the game application. Certainly, the server 103 may store game data of each application, and the first device 101 may also obtain the game data from the server 103.

Terms appearing in the foregoing process are described below:

The target drive file refers to a configuration file of the controller. In the embodiments of the present disclosure, the target drive file is used for simulating a controller in the operating system of the first device 101.

The storage space of the target drive file refers to a space allocated by the first device 101 to store the input information of the controller. In the embodiments of the present disclosure, the first device 101 stores the control information of the second device 102 in the storage space.

The management application includes a start portal for a plurality of applications. Any one of the plurality of applications may be started on an application interface of the management application. The application may be a game application. The management application may further provide various functions such as game information, item purchases, application downloads, game video live broadcasts, and game communities of a plurality of game applications, thereby providing a user with a game platform with one-stop service.

The operation control is an operation control included in a control area corresponding to the game application. The second device 102 may simulate at least one operation button in the control area. The operation control may simulate an operation button on the controller simulated on the first device 101, and the operation control has a control function corresponding to each operation button. The game application may include a virtual object. A process of controlling the virtual object by the controller may be simulated through the operation control. The operation control may be a virtual joystick button for controlling movement of the virtual object, a shooting button for controlling shooting of the virtual object, and the like. This is not limited in the embodiments of the present disclosure.

The virtual object is virtual, and is used for representing the user in the game. The virtual object may be in any form, for example, a person or an animal. This is not limited in the embodiments of the present disclosure.

For example, in a shooting game, the user may control the virtual object to fall freely, glide, open a parachute to fall, or the like in the sky of the three-dimensional virtual scene, or run, jump, crawl, bend forward, or the like on the land, or swim, float, dive, or the like in the ocean. Certainly, the user may alternatively control the virtual object to drive a vehicle to move in the three-dimensional virtual scene. Herein, the foregoing scene is merely used as an example for description, and this is not specifically limited in the embodiments of the present disclosure.

In addition, the foregoing process may be alternatively implemented in a game application, that is, the second device 102 and the first device 101 exchange data based on the game application, and a process of controlling the virtual object of the first device 101 based on the control information of the second device 102 is realized. This is not specifically limited in the embodiments of the present disclosure. The foregoing process is described merely by using the management application as an example. The second device 102 may be a mobile terminal, and the first device 101 may be a fixed terminal, so that the user can easily control the virtual object on the second device 102 anytime and anywhere. For example, the second device may be a mobile phone, a portable Android device (Pad), or the like; and the first device may be a personal computer (PC), a television, or the like. Certainly, the second device 102 and the first device 101 may be any device on which the application is installed. This is not specifically limited in the embodiments of the present disclosure.

In the following embodiments, that the management application is a game management application is used as an example for description. The game management application may include a start portal for a plurality of game applications. Certainly, the management application may alternatively include a start portal for other applications. This is not specifically limited in the embodiments of the present disclosure. For example, the management application may alternatively be a video management application. The video management application may include a start portal for a plurality of video applications. The second device 102 may alternatively be a smart television, and the first device 101 may be a PC. The user performs real-time control operations on the smart television, to control a video screen displayed synchronously on the smart television and the PC.

Figure 2:
FIG. 2 is a signaling interaction diagram of a control information processing method according to the embodiments of the present disclosure.

FIG. 2 is a signaling interaction diagram of a control information processing method according to the embodiments of the present disclosure. The method may be implemented through interaction between a first device and a second device. Referring to FIG. 2, the method includes the following steps:

201. The second device sends a connection request to the first device.

In the embodiments of the present disclosure, a streaming function is configured in the management application. The streaming function refers to a function of data synchronization with a target device. The second device enables the streaming function of the management application, and finds a plurality of candidate devices within a preset range of the second device based on the streaming function, and based on a first device selected from the plurality of candidate devices, sends a connection request to the first device, where the connection request carries a device identifier of the first device.

The second device may further sift out a plurality of candidate devices within the preset range of the second device based on a certain sifting condition. The process may be as follows: The second device finds a plurality of devices according to a geographic location of the second device, sifts out a plurality of candidate devices from the plurality of devices according to the sifting condition, and displays device identifiers of the plurality of candidate devices on the application interface of the management application, for the user to select. The sifting condition may include, but is not limited to: enabling the streaming function of the management application, connecting to the same network with the second device, supporting access of the controller, starting the management application, being in a power-on state, and the like.

202. The first device establishes a connection to the second device based on the connection request.

The first device receives the connection request of the second device, and establishes a connection to the second device according to the connection request. The connection between the second device and the first device may be established based on a transmission control protocol (TCP). The second device sends the connection request to the server, and the server forwards the connection request to the first device. The server is a backend server of the management application. The first device establishes the connection to the second device based on the connection request, receives, according to the connection, an application identifier sent by the second device, and runs an application corresponding to the application identifier.

In one embodiment, when the second device successfully establishes a connection to the first device, the second device may display a plurality of applications on the application interface of the management application, and send an application identifier of a selected application in the plurality of applications to the first device. In a possible implementation, the second device may send a streaming request to the first device based on the application identifier of the selected application. The streaming request is used for instructing to perform data synchronization with the target device. The first device receives the streaming request sent by the second device, obtains the application identifier of the application from the streaming request, and runs the application.

The management application may be a game management application, and the application may be a game application. The second device may display cover images of the plurality of game applications on the application interface of the game management application. The cover images include a plurality of pieces of game information such as the virtual object of the game application, a game name corresponding to the application, the virtual scene of the game, or a game rule. The user may select a to-be-started application according to the cover images of the plurality of applications. The second device may send, according to a triggered cover image in the plurality of cover images, an application identifier of an application corresponding to the triggered cover image to the first device. The application identifier may be an identity (ID) of the application.

Figure 3:
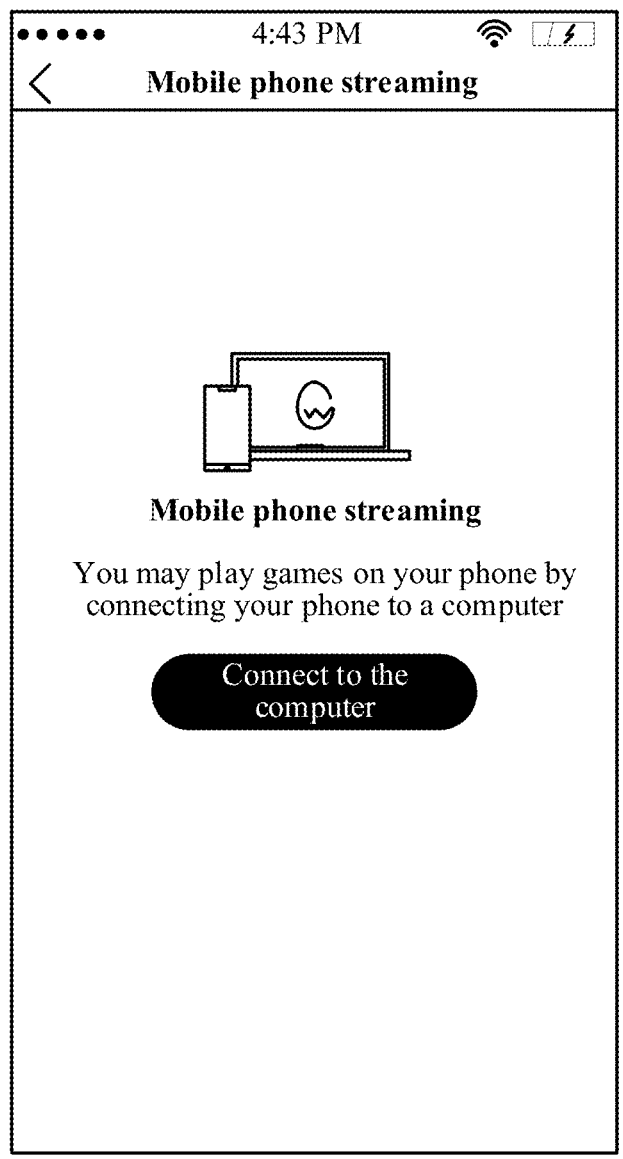
FIG. 3 is a schematic diagram of a display interface of a second device according to the embodiments of the present disclosure.
Figure 4:
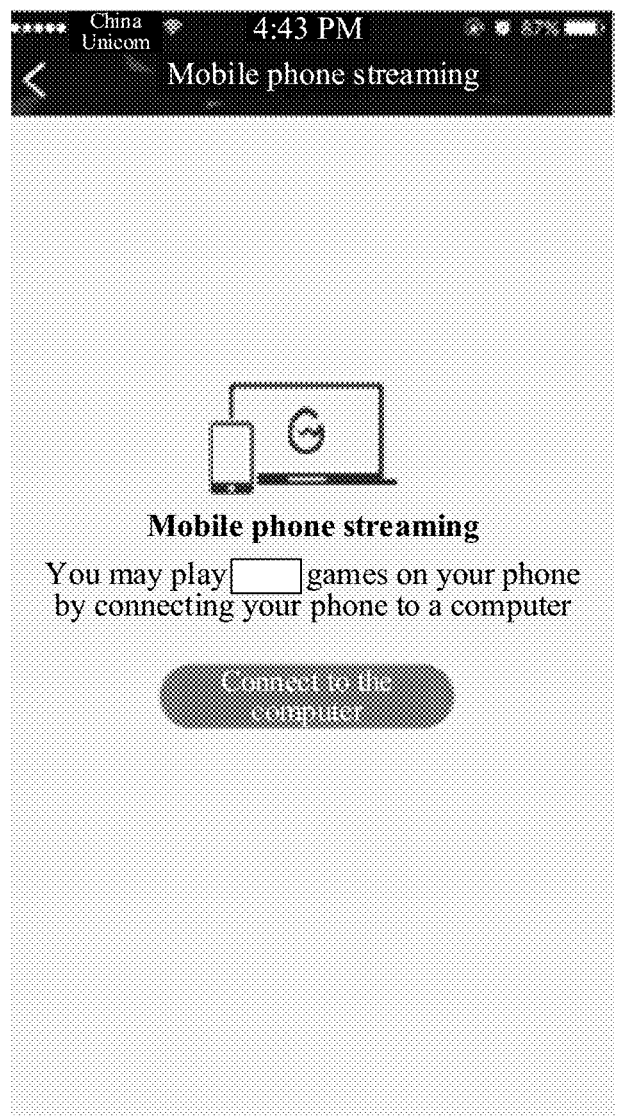
FIG. 4 is a schematic diagram of another display interface of the second device according to the embodiments of the present disclosure.
Figure 5:
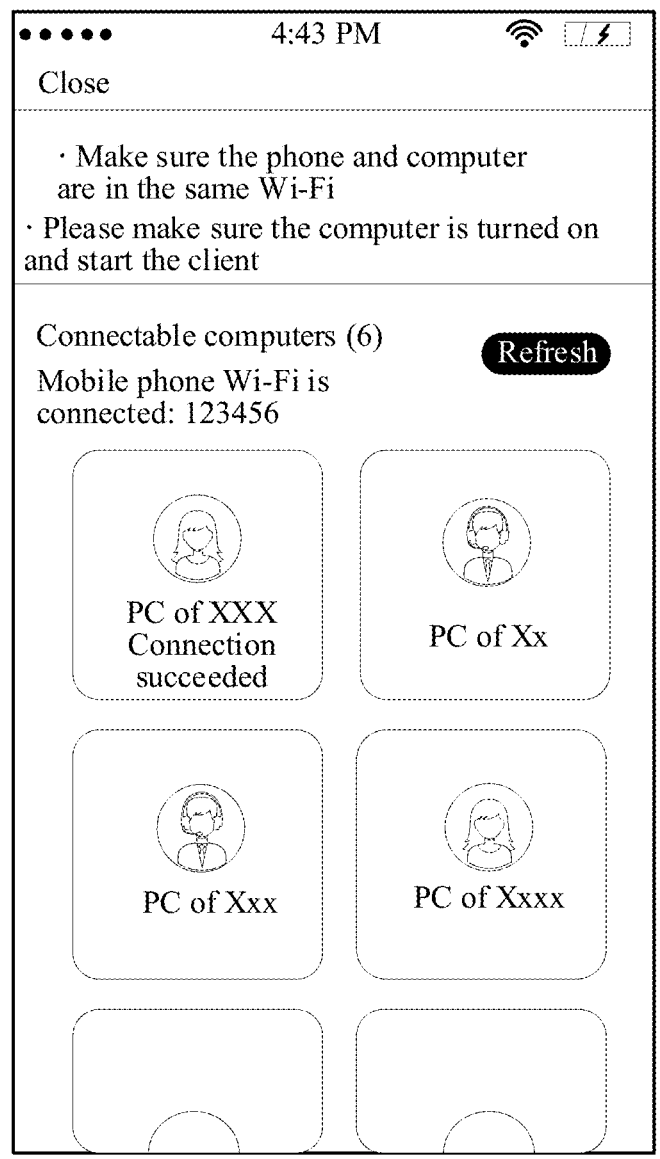
FIG. 5 is a schematic diagram of another display interface of the second device according to the embodiments of the present disclosure.
Figure 6:
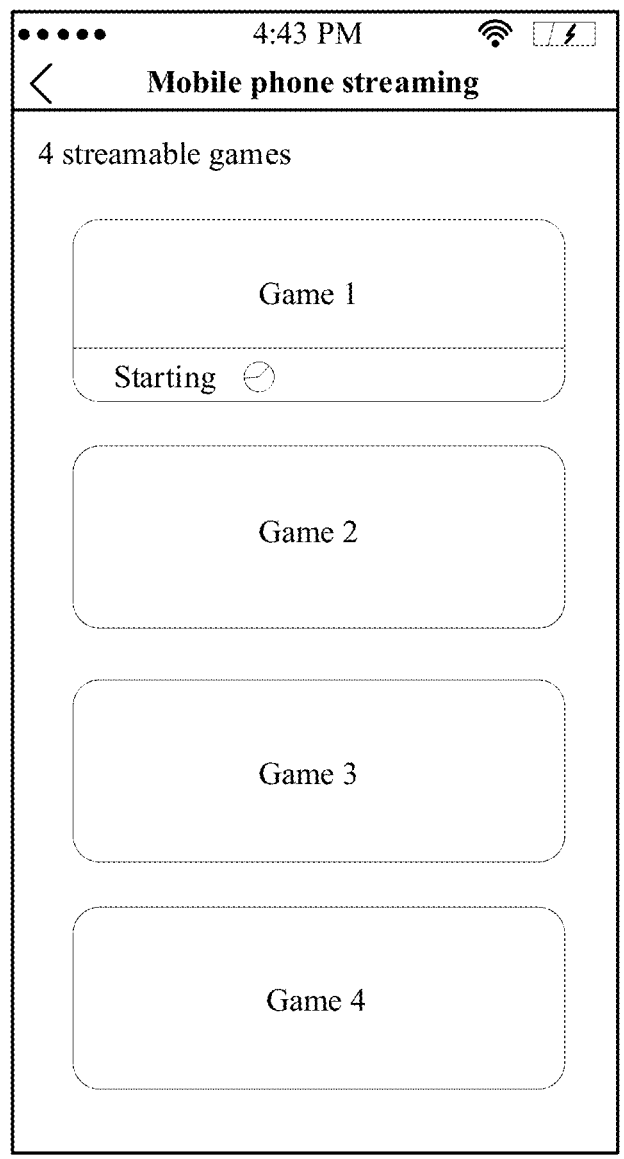
FIG. 6 is a schematic diagram of another display interface of the second device according to the embodiments of the present disclosure.

As shown in FIG. 3, the second device starts the management application and enables the streaming function. An interface of the streaming function is shown in FIG. 3. FIG. 4 is a schematic diagram of an actual interface corresponding to the corresponding streaming function interface of FIG. 3. The second device displays a connection button on the streaming function interface of the management application. When the connection button is triggered, the second device starts to search for candidate devices in a surrounding area that meet the sifting condition, and displays device identifiers of a plurality of candidate devices on a current display page. As shown in FIG. 5, the user selects a first device on the left from a plurality of candidate devices as a to-be-connected first device, and the second device sends a connection request to the first device and establishes a connection to the first device. After the second device successfully establishes the connection to the first device, as shown in FIG. 6, the second device displays cover images of a plurality of applications in the management application, and sends an application identifier of a to-be-started application to the first device based on a selected cover image.

Further, the first device displays a multimedia screen of the application on the second device. The multimedia screen includes a virtual scene of the application and virtual objects in the virtual scene.

In the embodiments of the present disclosure, the foregoing steps 201 and 202 are a process of establishing a connection between the first device and the second device based on the streaming function of the management application, that is, the first device and the second device execute streaming logic of the management application, to establish a connection. Further, the first device may further synchronize the multimedia data displayed on the first device to the second device based on the streaming logic. The first device may start the game application based on triggering of the second device. Certainly, the first device may alternatively start the game application before receiving the connection request of the second device. That is, the first device may alternatively access the second device when running the game application. The foregoing steps are merely described by using an example in which the second device triggers the first device to run the game application. However, an execution sequence of the first device running the game application and accessing the second device is not specifically limited in the embodiments of the present disclosure.

The first device and the second device may establish a connection based on the management application. A process of data exchange between the first device and the second device is implemented based on the backend server of the management application. In addition, the first device may further synchronize multimedia data locally displayed to the second device, realizing a process of synchronous display of a screen on the two devices. Moreover, the first device may synchronize a game screen to the second device based on game data generated when running the game application. The second device does not need to run the game application, but merely displays the game screen in real time based on the game data, thereby improving memory processing efficiency of the second device.

203. The first device simulates a controller on the first device based on a target drive file of the first device.

The target drive file is used for simulating a controller in an operating system of the first device. In the embodiments of the present disclosure, device addition logic of the controller is configured in the target drive file, and the device addition logic is used for indicating an addition process of the controller. The first device may add the controller on the first device based on the device addition logic in the target drive file.

The first device runs the target drive file, and sends a device addition instruction to the target drive file, the device addition instruction being used for instructing to add a controller in the operating system of the first device. The first device adds, based on the device addition logic in the target drive file and device information carried by the device addition instruction, a controller corresponding to the device information in the operating system of the first device. The target drive file includes device addition logic of the controller, and the device addition logic is used for indicating a process of adding the controller on the first device.

The first device may further, based on the device addition logic in the target drive file, send the device information and a storage format of the input information of the controller to a device manager of the first device; and send a notification message to an input device driver manager of the first device, the notification message being used for notifying that the controller is added in the operating system of the first device.

The first device simulates a controller on the first device based on execution logic of the game management application. The device information may be configured in a configuration file of the game management application. The first device obtains the device information, and sends the device addition instruction to the target drive file based on the execution logic of the game management application. The device information includes a device identifier of the controller. The device identifier is a device identifier of a controller supported by the game application or the game management application. The device information may further include configuration description information of the controller. The configuration description information is used for indicating that the controller is a human interface device (HID). The controller may be a HID. For example, the controller may be a game handle.

Figure 7:
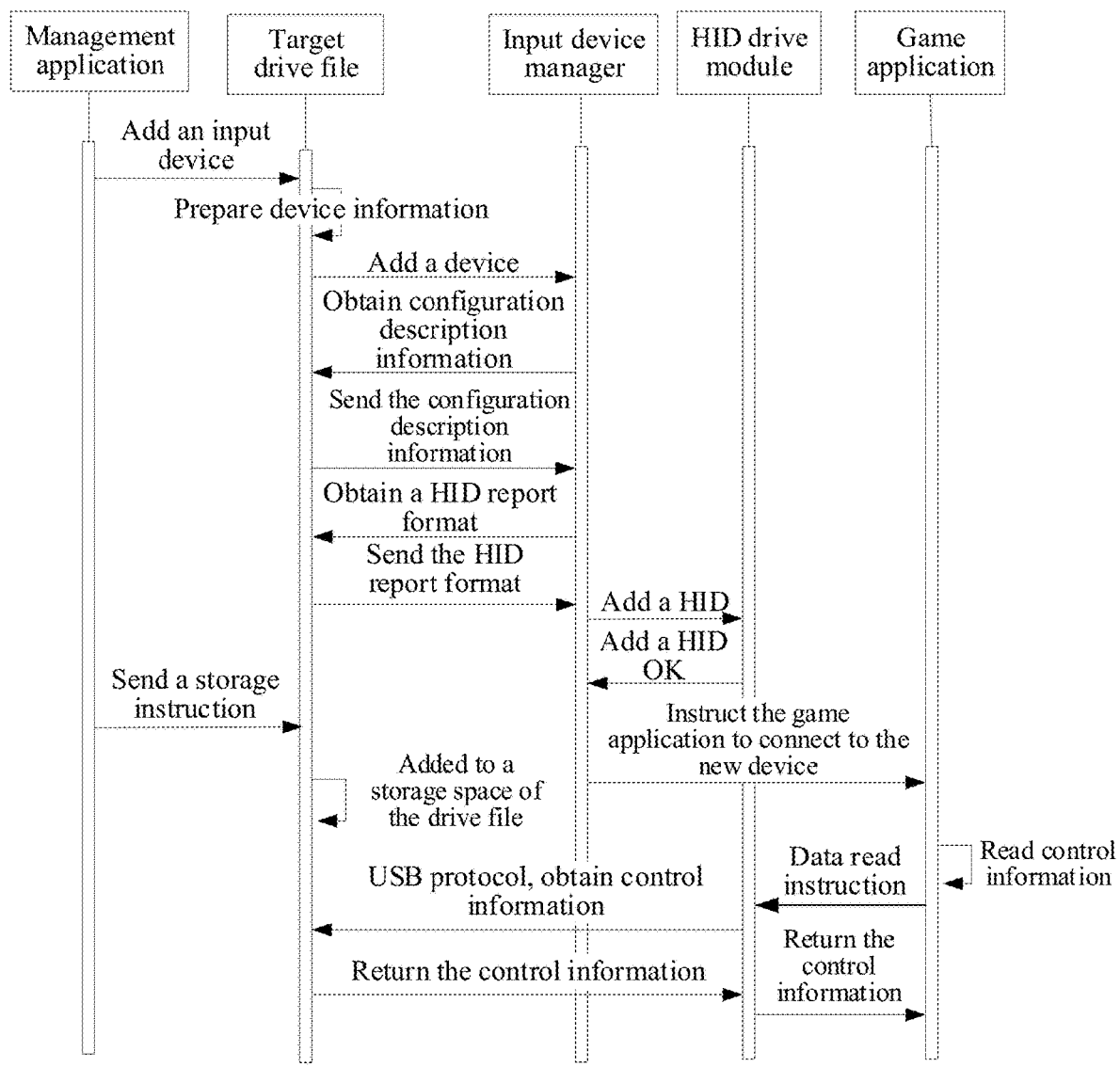
FIG. 7 is a schematic flowchart of adding a controller according to the embodiments of the present disclosure.

As shown in FIG. 7, the device manager may be an input device manager. For example, the device manager may be a plug-and-play manager (PNP manager). Based on the device information in the device addition instruction, the first device invokes a device addition interface of the first device, and sends a device addition message to the input device manager in the first device. The device addition message is used for indicating that the controller is added in the operating system of the first device, and the device addition message carries the device information of the controller. The input device manager is configured to manage a controller connected to the first device. The input device manager may store a device information set of all external devices on the first device. The input device manager adds device information of the controller to the device information set. The input device manager determines, based on the configuration description information, that the controller is a HID. In this case, the input device manager may further send an obtaining request to the target drive file, the obtaining request being used for instructing to obtain the storage format of the input information of the controller. When receiving the obtaining request, the target drive file returns the storage format of the input information of the controller to the input device manager according to the obtaining request. The storage format may be a HID report format.

In some game applications, there may be a plurality of virtual objects. In the embodiments of the present disclosure, there may be one or more second devices. Each second device correspondingly controls one virtual object. One or more pieces of device information may be configured in the game management application. The first device may simulate one or more controllers on the first device based on the one or more pieces of device information. In a possible implementation, when a plurality of virtual objects are included in the game application, for example, two users respectively correspond to two virtual objects in the game application of the first device, the device information may further include an instance ID used for indicating a corresponding virtual object in the game application, so that the first device controls a plurality of virtual objects in the game respectively based on a plurality of pieces of control information of a plurality of second devices.

In the embodiments of the present disclosure, the input device driver manager may be a HID drive module. The input device driver manager is located at a drive layer of the first device, and applications in the first device are located at an application layer of the first device. The input device driver manager may exchange data with the applications at the application layer based on a device control interface. The first device may initialize the input device driver manager based on the controller. An initialization process may be as follows: The first device sends a first notification message to the input device driver manager (for ease of distinction, a notification message sent to the input device driver manager is referred to as the first notification message). The first notification message is used for indicating that the controller is added in the operating system of the first device. The first device stores the device information of the controller into the input device driver manager, to facilitate subsequent read of the input information of the controller based on the input device driver manager. The device control interface may include a Device IO Control function. The Device IO Control function is used for data interaction between the application layer and the drive layer, for example, to send a control code to a specified device drive program. The first device may realize a process in which the application layer of the first device reads the input information of the controller from the drive layer by invoking the Device IO Control function.

Further, the first device sends a second notification message to a game application at the application layer (for ease of distinction, a notification message sent to the application is referred to as the second notification message). The second notification message is used for indicating that a controller is added in the operating system of the first device. The first device invokes a device enumeration interface based on execution logic of the game application, to obtain the device information of the controller.

Figure 8:
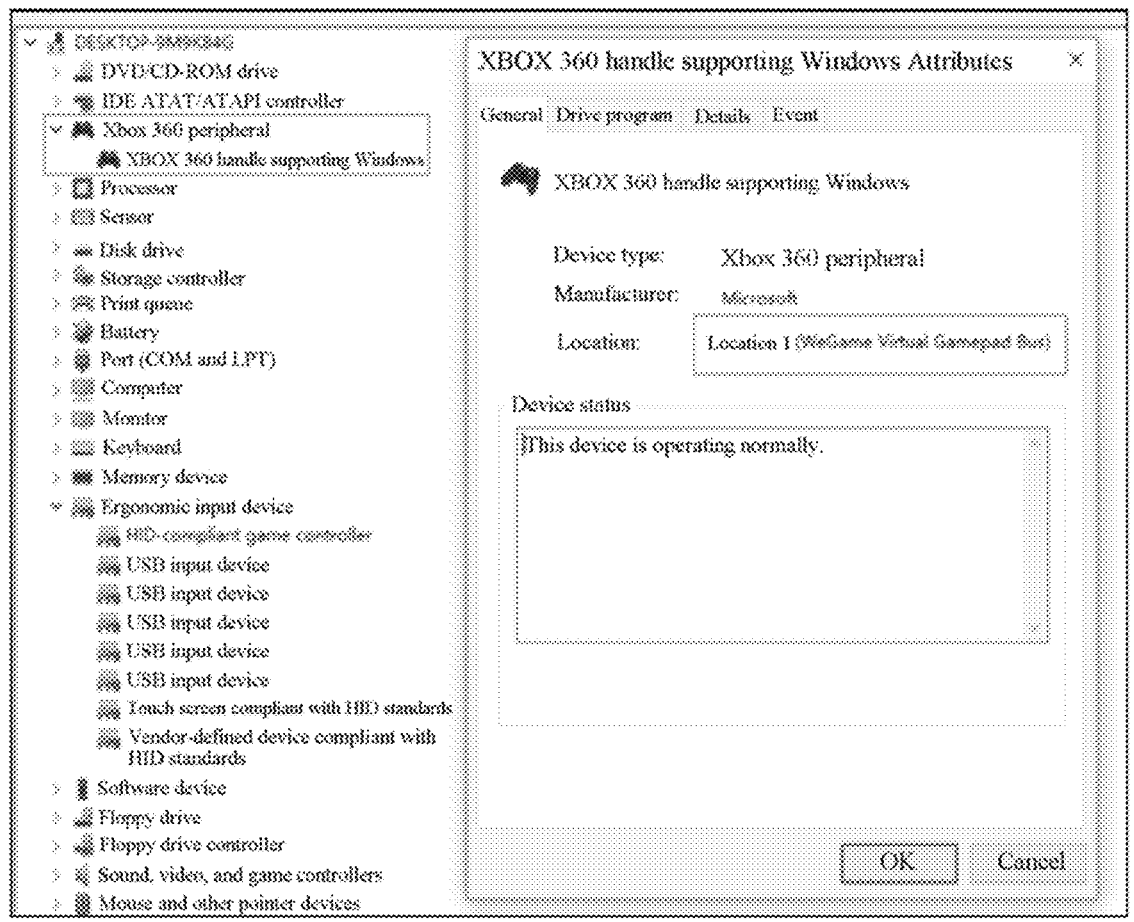
FIG. 8 is a schematic diagram of displaying information about a controller simulated on a first device according to the embodiments of the present disclosure.

As shown in FIG. 8, the controller being a virtual game handle is used as an example. When the first device runs the target drive file, a handle icon of the virtual game handle is added to the device management interface of the first device, and corresponding handle information is further stored in the input device manager. That is, a game handle is simulated on the first device, but in fact the first device is not connected to an actual handle device.

The target drive file is pre-stored on the first device. The first device may run the target drive file based on the execution logic of the management application, and trigger execution of the device addition logic in the target drive file by sending a device addition instruction to the target drive file, to simulate a process of adding a controller on the first device, thereby simulating a controller at the drive layer. A currently connected device at the drive layer is changed, so that there is no need to alter execution logic of each game application in the management application. Execution logic of invoking a device enumeration interface or invoking a device data read interface in each game application is executed normally, thereby ensuring that a game process on the management application is not interrupted by a protection program, and ensuring the stability of operation control.

An execution sequence of the first device running the target drive file and an execution sequence of step 201 and step 202 are not specifically limited in the embodiments of the present disclosure. That is, the first device may run the target drive file before establishing a connection to the second device, or the first device may run the target drive file only when establishing a connection to the second device.

204. The first device sends first multimedia data to the second device.

The first multimedia data is multimedia data displayed on the first device. The first device may collect first multimedia data displayed on a display interface of the first device in real time, and send the first multimedia data to the second device, to realize synchronous display on the first device and the second device. If the management application is a game management application, and the first device runs a game application in the game management application, the first multimedia data may be data generated in a process in which the first device runs the game application. In this step, in the process in which the first device runs the game application, the first device collects first multimedia data of a to-be-displayed multimedia screen, and sends the first multimedia data to the second device through a communication connection to the second device. The game application may include a virtual object. The multimedia screen includes a virtual scene of the game application and virtual objects in the virtual scene. The game management application has a streaming function. Based on the streaming function of the game management application, the first device sends the first multimedia data displayed during running of the game application to the second device in real time, so that the first device and the second device simultaneously display the game screen.

In the embodiments of the present disclosure, the first device performs digital-to-analog signal conversion on the to-be-displayed first multimedia data in real time by using a graphics card, to display the multimedia screen. The first device may collect the first multimedia data from the graphics card in real time, that is, to-be-displayed data of the first device, to realize synchronous display on the first device and the second device. The multimedia data may include, but is not limited to: video data, image data, audio data, text, and the like. In addition, the multimedia screen may further include a virtual item, a level and a nickname of the virtual object, and the like. This is not specifically limited in the embodiments of the present disclosure.

205: The second device receives the first multimedia data of the first device.

The second device receives the first multimedia data of the first device in real time based on the communication connection to the first device.

The second device may receive the first multimedia data of the first device in real time, thereby ensuring that display interfaces of the second device and the first device can be displayed simultaneously, and ensuring that the user can seamlessly browse, on the first device, the multimedia screen on the second device, and improving the convenience of operation control.

206. The second device displays a UI of a game application on the second device based on the first multimedia data.

The UI includes the multimedia screen of the game application on the first device and at least one operation control in the control area. In the embodiments of the present disclosure, the second device may determine, according to the first multimedia data and at least one operation control, a UI of the game application on the second device, and display the UI on the display interface. In this step, the second device may generate a multimedia screen of the game application according to the first multimedia data, and add at least one operation control to the multimedia screen of the game application, to obtain the UI of the game application, and display the UI on the second device. The second device may display the UI of the game application on the second device based on the streaming function of the game management application.

In a possible implementation, the second device may simulate a control operation on the virtual object by an actual input device through the operation control. According to at least one operation button included in the actual input device, the second device adds an operation control corresponding to each operation button to the multimedia screen, to obtain the UI of the game application. Each operation control corresponds to a piece of control information. A function of each operation control is the same as that of an operation button corresponding to the operation control. That is, the second device may use control information corresponding to the operation button as control information of the corresponding operation control, to simulate a control operation on the virtual object by a controller through the operation control. The controller may be a game handle. The second device may display, on the UI, operation controls respectively corresponding to steering wheel buttons and A, B, C, and D control buttons of the game handle, to simulate physical buttons in the game handle. In a possible game scenario, a left side of the display interface of the second device may include a joystick button of a control area, and a right side may include a switch button of a virtual item and a shooting button of a virtual object. For example, the user may trigger the switch button to switch virtual items for the virtual object, or trigger the shooting button to control the virtual object to aim, shoot, or the like in the virtual game scene.

Figure 9:
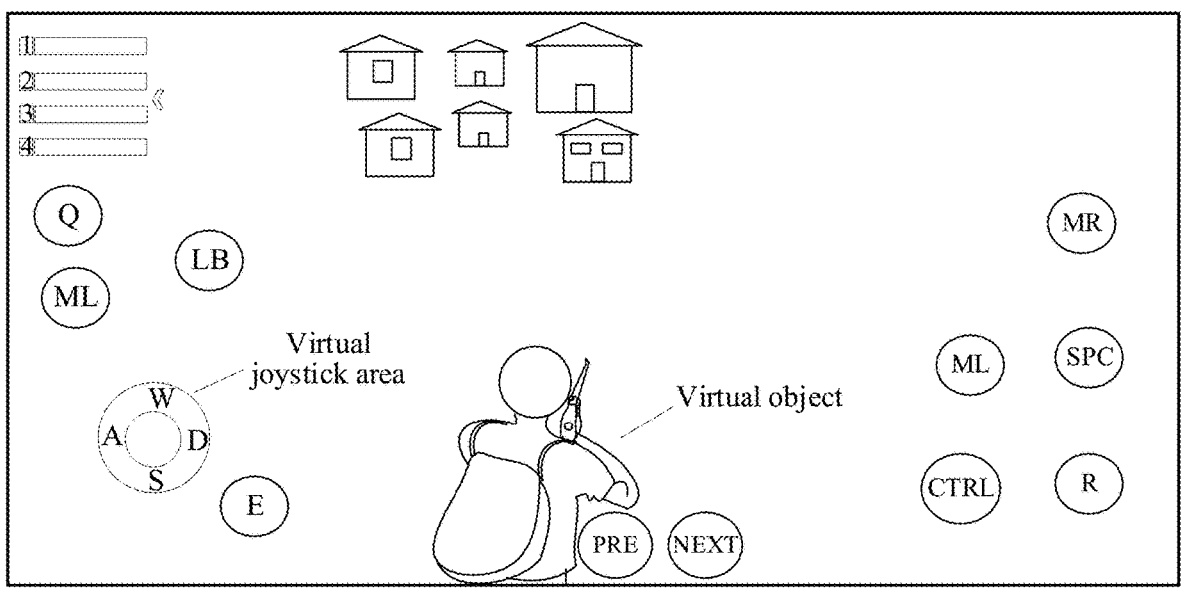
FIG. 9 is a schematic diagram of a user interface (UI) displayed on the second device according to the embodiments of the present disclosure.

As shown in FIG. 9, the second device may be in a virtual joystick area of the UI and various function buttons, for example, an aiming button and a shooting button, and display a virtual item switching button at the bottom. For details, refer to display of buttons shown in FIG. 9, such as an ML button, an LB button, a Q button, an MR button, an SPC button, an E button, an R button, a CTRL button, a PRE button, and a NEXT button. Specific functions and specific display locations of the buttons may be determined according to a model of a virtual input device, or may be any function and display location. This is not limited in the embodiments of the present disclosure.

In the embodiments of the present disclosure, the foregoing steps 204 to 206 are actually a specific implementation of a step "the second device displays, on the second device, a control area of an application on the first device, the control area including at least one operation control of the application." In the foregoing implementation, actually, the second device simultaneously displays the operation control and the multimedia screen in the control area. Certainly, the second device may alternatively merely display the operation control. In this case, the foregoing steps 204 to 206 may be replaced with: according to a display location of each operation control of the application in the control area, the second device displays, in the control area of the second device, the at least one operation control. According to at least one operation button included in the actual input device, the second device may display, in the control area of the second device, an operation control corresponding to each operation button. The operation control may alternatively be the operation control corresponding to each button in the game handle. The user may browse a multimedia screen from the first device, and perform a game operation through an operation control on the second device.

207. The second device obtains, when a touch operation on any operation control is detected, control information of the operation control.

The control information is used for controlling the application on the first device to perform a corresponding operation. The user may trigger any operation control to control the application running on the first device. The second device may monitor each operation control in the UI, to obtain a trigger state of each operation control in real time. When the second device detects a touch operation on any operation control, the second device obtains control information corresponding to the operation control. The second device stores a correspondence between each operation control and control information. According to a triggered operation control, the second device obtains control information corresponding to the triggered operation control from a correspondence between the operation control and the control information.

The application may include a virtual object, and the control information may be information for controlling the virtual object in the application. In a possible implementation, the control information may be action information, switching information, and the like of the virtual object in the application.

In a possible implementation, the user may further control the application through a gesture operation on the UI, and the control information may be alternatively obtained by triggering the gesture operation. The control information may alternatively be a trigger location on the UI of the application, a trigger track on the UI of the application, and the like. In this case, the second device may further monitor the gesture operation on the UI in real time, and when detecting the gesture operation on the UI, obtain the trigger location and/or the trigger track of the gesture operation on the UI. The gesture operation may be a sliding operation, a click operation, a double-click operation, and the like. The sliding operation may include an operation of sliding left and right, an operation of sliding up and down, and the like.

As shown in FIG. 9, the user may adjust a viewing angle range of the virtual object by sliding left and right or up and down, or the user may double-click to zoom in on a virtual item or a virtual scene area for viewing.

208. The second device sends control information corresponding to the operation control to the first device.

The second device may obtain the control information corresponding to the triggered operation control in real time, and send the control information to the first device in real time through the communication connection to the first device.

209. The first device receives the control information sent by the second device.

In a process of running the game application, the first device receives the control information sent by the second device in real time based on the connection established with the second device.

The above steps 207 to 209 may be that the second device sends the control information to the first device based on the streaming function of the game management application, and the first device receives the control information of the second device in real time based on the streaming function of the game management application, thereby realizing synchronization of the control information between the two devices.

210. The first device stores the control information as input information of the controller into a storage space of a target drive file.

In the embodiments of the present disclosure, the first device stores, according to a storage space of the input information of the controller, that is, the storage space of the target drive file, the control information as the input information of the controller into the storage space of the target drive file. The storage space of the target drive file refers to a space allocated by the first device to store the input information of the controller.

In this step, the target drive file may further include storage logic, the storage logic being used for indicating a storage process of the input information of the controller. Based on the storage logic in the target drive file, the first device may store the control information as the input information of the controller into the storage space of the target drive file. The first device may send a storage instruction to the target drive file, the storage instruction being used for instructing to store the control information as the input information of the controller. The first device executes the storage logic in the target drive file according to control information carried by the storage instruction. The first device may send a storage instruction to the target drive file of the drive layer through the management application, to trigger the target drive file to perform storing.

In a possible implementation, the input information of the controller is stored in a specified storage format. The first device may further store the control information into the storage space of the target drive file according to the storage format of the input information of the controller. The controller may be a HID, and the storage format may be a HID report format of the HID. In this case, the first device may convert the control information into the HID report format according to the HID report format and store the input information in the storage space of the target drive file.

In the embodiments of the present disclosure, based on execution logic of the management application, the first device stores the control information as the input information of the controller into the storage space of the target drive file.

The control information is stored into a storage address of the input information in the storage format of the input information, so that the application can normally execute the logic of reading the input information of the controller, and read actual control information of the application. In the first device, a process of storing information inputted by the controller is simulated, so that the control information may be accurately stored, and may be accurately read without error during subsequent use. Meanwhile, there is no need to change device read logic of the application, and operation control costs are relatively low, thereby ensuring that the control information of the second device can be read accurately, the application on the first device can be executed smoothly, and the accuracy and practicality of the operation control are improved.

211. The first device obtains the control information from the storage space of the target drive file when a data read instruction is received.

The data read instruction is used for instructing to read the input information of the controller. When the first device receives the data read instruction, the first device obtains the control information from the storage space of the target drive file based on execution logic of a device data read interface. The first device invokes the device data read interface based on the execution logic of the game application, to obtain the control information. The device data read interface is configured to read the input information of the controller on the first device. Because the first device invokes the device enumeration interface to obtain the device information of the controller based on the execution logic of the game application in advance, in this step, the first device invokes the device data read interface based on the device information of the controller, to obtain the control information from the storage space of the target drive file.

The controller may be an external input device. The first device may obtain the input information of the controller through the input device driver manager in the first device. In this case, the first device sends the data read instruction to the input device driver manager of the first device, the input device driver manager being configured to return the input information of the controller to the application; and the first device reads the control information in the storage space of the target drive file through the input device driver manager according to the data read instruction.

The first device sends the data read instruction to the input device driver manager. The data read instruction may carry the device information of the controller. Based on the device information, the input device driver manager may send the data read instruction to the target drive file corresponding to the device information through a universal serial bus (USB) communication protocol. The target drive file reads the control information from the storage space, and returns the control information to the input device driver manager. The input device driver manager returns the control information to the application. In addition, the control information is stored in a certain format. A storage format of the control information is stored in an input device manager of the first device. Therefore, the first device obtains the storage format from the input device manager, and according to the storage format, further converts control information returned by the input device driver manager, to obtain original data of the control information. The first device may convert the stored data into the control information according to a data format corresponding to the HID report format.

In a possible implementation, the second device may send the control information in real time, and a plurality of pieces of control information may be stored in the storage space. In this case, when the first device runs the application, the first device sequentially reads each piece of control information from the storage space of the target drive file according to storage information of the plurality of pieces of control information; and according to the each piece of control information, the first device displays on the UI a process in which the virtual object performs an operation corresponding to the each piece of control information. The storage information may be information such as a storage address or a storage order of each piece of control information. The first device may sequentially read a first stored piece of control information from the storage space of the target drive file according to the storage order or the storage address.

As shown in FIG. 7, the input device driver manager being a HID drive module is used as an example. Based on execution logic included in the game application, the first device invokes the device data read interface, and sends the data read instruction to the HID drive module through a device control interface. The HID drive module sends an obtaining request to the target drive file through the USB communication protocol. When receiving the obtaining request, the target drive file executes the read logic of the target drive file, reads the control information from the storage space of the target drive file, and returns the stored data to the HID drive module. The HID drive module returns the control information to the application. Certainly, the target drive file may further store the control information sent by the second device in real time.

212. The first device executes execution logic of the game application based on the control information.

The application includes a virtual object. The first device may control, according to the control information, the virtual object to perform an operation corresponding to the control information on the UI.

In the embodiments of the present disclosure, the control information includes at least one of action information of the virtual object, switching information, the trigger location of the UI, and the trigger track of the UI. Correspondingly, this step may include the following three cases.

In a first case, when the control information includes action information, the first device displays a process of the virtual object executing a target action on the UI according to the action information.

The action information is used for indicating controlling of the virtual object to perform the target action. The action information may be control information corresponding to the operation control, for example, an operation control of left and right movement, a jump control, and control of accelerative running. The corresponding action information may be respectively: move left and move right, jump, and accelerative running. In this step, the first device may control, according to the action information, the virtual object to execute the target action corresponding to the action information, and display a process of the virtual object executing the target action on the UI.

In a second case, when the control information includes switching information. The first device displays at least one candidate virtual item on the UI according to the switching information, and switches a current virtual item of the virtual object to a target virtual item.

The switching information may include first switching information and second switching information. The first switching information is used for indicating switching of the target virtual item of the virtual object. The first switching information may be control information corresponding to an icon of a virtual item currently displayed on the UI. Icons of different virtual items correspond to different switching information. For example, when a virtual backpack icon, a virtual clothing icon, or a virtual weapon icon is triggered, corresponding switching information may be: switch the virtual backpack, switch the virtual clothing, or switch the virtual weapon. In this step, the first device may display, on the UI according to a target virtual item indicated by the first switching information, a plurality of candidate virtual items corresponding to the target virtual item, for the user to select.

The second switching information may be control information corresponding to an icon of a candidate virtual item. When an icon of a target virtual item in the plurality of candidate virtual items is triggered, the first device displays, according to the triggered icon of the target virtual item, a process of switching the current virtual item of the virtual object to the target virtual item on the UI.

In a third case, when the control information includes the trigger track and/or the trigger location of the UI, the first device displays, on the UI according to the trigger track and/or the trigger location, a process of switching a viewing angle of the virtual object to a target viewing angle.

In the embodiments of the present disclosure, the user may alternatively adjust the viewing angle of the virtual object through a gesture operation such as a double-click operation or a sliding operation. The trigger track and the trigger location may be control information corresponding to the gesture operation. In this case, the first device determines, according to the control information corresponding to the trigger track and/or the trigger location, a target viewing angle corresponding to the trigger track and/or the trigger location, and displays on the UI that the viewing angle of the virtual object is switched to the target viewing angle.

213. The first device collects second multimedia data when a virtual object performs an operation, and sends the second multimedia data to the second device.

The first device may collect the second multimedia data from the graphics card of the first device. The second multimedia data is on a UI when the application on the first device executes an operation corresponding to the control information. The first device sends the second multimedia data to the second device.

214. The second device receives the second multimedia data sent by the first device, and displays, based on the second multimedia data, a UI when the virtual object performs an operation corresponding to the control information.

The second device receives the second multimedia data, and displays, on the second device according to the second multimedia data, a multimedia screen of the application performing the operation corresponding to the control information, so that the second device and the first device can synchronize display of the UI of the application.

The first device and the second device may execute the process of steps 213 and 214 based on the streaming function of the game management application.

Figure 10:
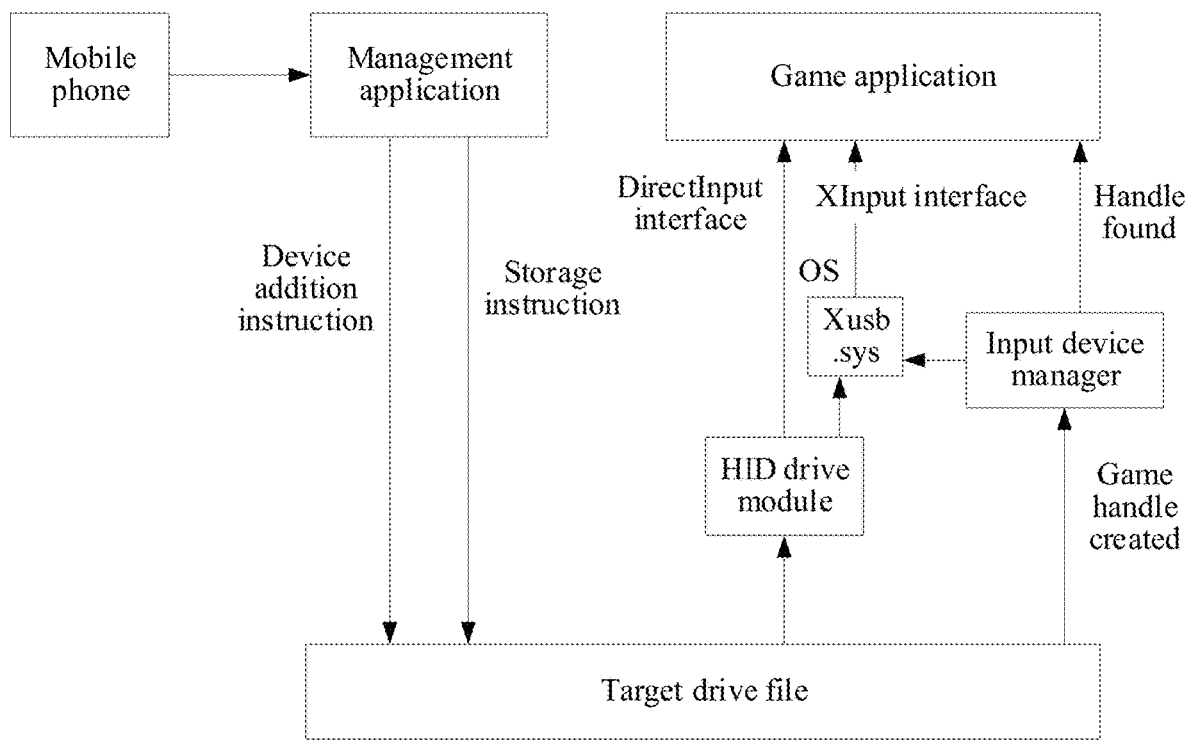
FIG. 10 is a schematic flowchart of control information processing according to the embodiments of the present disclosure.

FIG. 10 is an overall flowchart of the foregoing steps. The flowchart shown in FIG. 10 is used as an example to introduce the foregoing procedure. As shown in FIG. 10, an example in which the second device is a mobile phone and the controller is a game handle is used. The first device may be a PC. The mobile phone establishes a connection to the PC. The PC may run a target drive file. The PC sends a device addition instruction to the target drive file, to add a virtual game handle at a drive layer of the PC. When the game handle is successfully added, an operating system of the PC sends a notification message to an application at an application layer. The notification message is used for indicating that the PC is newly connected to a game handle. When receiving control information of the mobile phone, the PC sends a storage instruction to the target drive file, so that the control information is stored as game handle input information into the storage space of the target drive file. When the PC runs the game application, the device data read interface is invoked based on the execution logic of the application, to send a data read instruction to a HID drive module of the PC. The HID drive module obtains the control information from the target drive file based on the USB communication protocol. The device data read interface may be a DirectInput interface or an XInput interface. In addition, the input device manager stores the storage format of the control information. Therefore, the application may further obtain the storage format, that is, the HID report format, from the input device manager based on an Xusb.sys system file, to convert data returned by the HID drive module and obtain control information, so that the PC may control the game application in real time to execute an operation corresponding to the control information based on the control information.

According to the apparatus provided in the embodiments of the present disclosure, the first device simulates a controller on the first device based on the target drive file, and when the control information of the second device is received, the control information may be used as the input information of the controller to be stored. When receiving the data read instruction, the first device may obtain the control information from the storage space for storing the input information, that is, the storage space of the target drive file, so that there is no need to alter the execution logic of invoking the data read interface or the device enumeration interface in the application, avoiding being intercepted by the protection program on the first device and improving the stability of operation control.

It is to be understood that, although the steps are displayed sequentially according to the instructions of the arrows in the flowcharts of the embodiments, these steps are not necessarily performed sequentially according to the sequence instructed by the arrows. Unless otherwise explicitly specified in this specification, execution of the steps is not strictly limited, and the steps may be performed in other orders. In addition, at least some of the steps in the foregoing embodiments may include a plurality of substeps or a plurality of stages. These substeps or stages are not necessarily completed at the same moment, but may be performed at different moments. Besides, these substeps or stages may not be necessarily performed sequentially, but may be performed in turn or alternately with other steps or at least some of substeps or stages of other steps.

Figure 11:
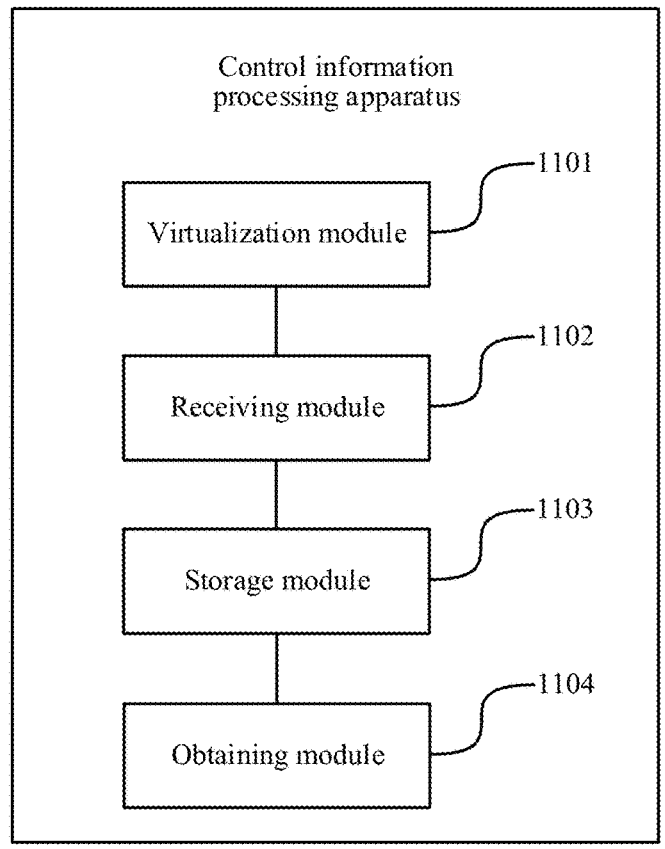
FIG. 11 is a schematic structural diagram of a control information processing apparatus according to the embodiments of the present disclosure.

FIG. 11 is a schematic structural diagram of a control information processing apparatus according to the embodiments of the present disclosure. The apparatus is applicable to a first device. Referring to FIG. 11, the device includes a simulator module 1101, a receiving module 1102, a storage module 1103, and an obtaining module 1104. The modules included in the control information processing apparatus may be implemented entirely or partially by software, hardware, or a combination thereof.

The simulator module 1101 is configured to simulate a controller on the first device based on a target drive file of the first device.

The receiving module 1102 is configured to receive control information sent by a second device, the control information being used for controlling the first device to perform a corresponding operation.

The storage module 1103 is configured to store the control information as input information of the controller into a storage space of the target drive file.

The obtaining module 1104 is configured to obtain the control information from the storage space of the target drive file when a data read instruction is received, the data read instruction being used for instructing to obtain the input information of the controller.

Optionally, the simulator module 1101 includes:
a running unit, configured to run the target drive file;
a sending unit, configured to send a device addition instruction to the target drive file, the device addition instruction being used for instructing to add a controller in an operating system of the first device; and
an addition unit, configured to add, based on device addition logic in the target drive file and device information carried by the device addition instruction, a controller corresponding to the device information in the operating system of the first device.

Optionally, the addition unit is further configured to invoke a device addition interface of the first device according to the device addition instruction, and add a controller corresponding to the device information in the operating system of the first device; send the device information and a storage format of the input information of the controller to a device manager of the first device; and send a notification message to an input device driver manager of the first device, the notification message being used for notifying that the controller is added in the operating system of the first device.

Optionally, the storage module 1103 is further configured to send a storage instruction to the target drive file, the storage instruction being used for instructing to store the control information as input information of the controller; and execute storage logic in the target drive file according to control information carried by the storage instruction, the storage logic being used for indicating a storage process of the input information of the controller.

Optionally, the storage module 1103 is further configured to store the control information into the storage space of the target drive file according to the storage format of the input information of the controller.

Optionally, the obtaining module 1104 is further configured to sequentially read each piece of the control information from the storage space of the target drive file according to storage information of the plurality of pieces of control information when a data read instruction is received.

Optionally, the obtaining module 1104 is further configured to send the data read instruction to the input device driver manager of the first device, the input device driver manager being configured to return the input information of the controller; and read the control information in the storage space of the target drive file through the input device driver manager according to the data read instruction.

Optionally, the apparatus further includes:
  a sending module, configured to establish a connection to the second device when a connection request from the second device is received; and collect first multimedia data displayed on the first device, and send the first multimedia data to the second device.

Optionally, the receiving module 1102 is further configured to receive control information corresponding to a triggered operation control among a plurality of operation controls displayed on the second device.

Each module/unit and/or submodule/subunit in various disclosed embodiments can be integrated in a processing unit, or each module/unit and/or submodule/subunit can exist separately and physically, or two or more modules/units and/or submodule/subunit can be integrated in one unit. The modules/units and/or submodule/subunit as disclosed herein can be implemented in the form of hardware (e.g., processing circuitry and/or memory) or in the form of software functional unit(s) (e.g., developed using one or more computer programming languages), or a combination of hardware and software.

According to the apparatus provided in the embodiments of the present disclosure, the first device simulates a controller on the first device based on the target drive file, and when the control information of the second device is received, the control information may be used as the input information of the controller to be stored. When receiving the data read instruction, the first device may obtain the control information from the storage space for storing the input information, that is, the storage space of the target drive file, so that there is no need to alter the execution logic of invoking the data read interface or the device enumeration interface in the application, avoiding being intercepted by the protection program on the first device and improving the stability of operation control.

All the foregoing optional technical solutions may be randomly combined to form optional embodiments of the present disclosure.

When the control information processing apparatus provided in the foregoing embodiment processes control information, the division of the foregoing function modules is merely used as an example for description. In actual application, the foregoing functions may be assigned to and completed by different function modules as required. That is, an internal structure of the device may be divided into different function modules to complete all or some of the functions described above. Besides, the control information processing apparatus provided in the foregoing embodiment and the embodiment of the control information processing method are based on the same concept. For a specific implementation procedure, refer to the method embodiment.

Figure 12:
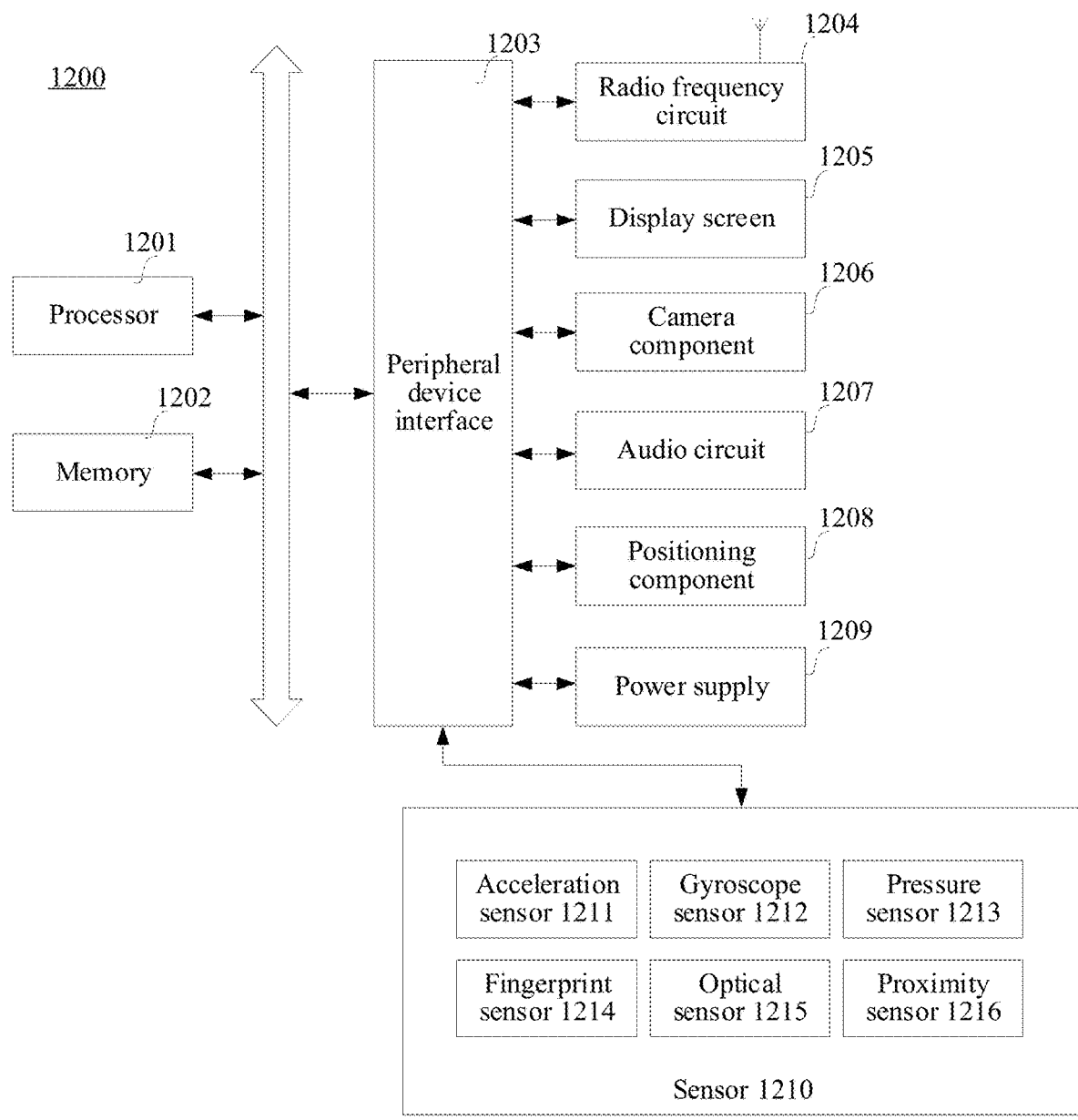
FIG. 12 is a structural block diagram of a terminal 1200 according to an exemplary embodiment of the present disclosure.

In an embodiment, an electronic device is provided, including a memory and a processor, the memory storing computer-readable instructions, the computer-readable instructions, when executed by the processor, causing the processor to perform the steps of the foregoing control information processing method. The steps of the control information processing method may be the steps of the control information processing method in the foregoing embodiments. The electronic device may be specifically a terminal. FIG. 12 is a structural block diagram of a terminal 1200 according to an exemplary embodiment of the present disclosure. The terminal 1200 may be a smartphone, a tablet computer, a moving picture experts group audio layer III (MP3) player, a moving picture experts group audio layer IV (MP4) player, a notebook computer, or a desktop computer. The terminal 1200 may also be referred to as other names such as user equipment, a portable terminal, a laptop terminal, or a desktop terminal.

Generally, the terminal 1200 includes a processor 1201 and a memory 1202.

The processor 1201 may include one or more processing cores. For example, the processor 1201 may be a 4-core processor or an 8-core processor. The processor 1201 may be implemented by using at least one hardware form of a digital signal processor (DSP), a field-programmable gate array (FPGA), and a programmable logic array (PLA). The processor 1201 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1201 may be integrated with a graphics processing unit (GPU). The GPU is responsible for rendering and drawing content to be displayed by a display screen. In some embodiments, the processor 1201 may further include an artificial intelligence (AI) processor. The AI processor is configured to process computing operations related to machine learning.

The memory 1202 may include one or more computer-readable storage media that may be non-transitory. The memory 1202 may further include a high-speed random access memory, and a non-volatile memory such as one or more magnetic disk storage devices and a flash storage device. In some embodiments, a non-transitory computer-readable storage medium in memory 1202 stores computer-readable instructions, the computer-readable instructions, when executed by the processor, causing the processor to perform the steps of the foregoing control information processing method. The steps of the control information processing method may be the steps of the control information processing method in the foregoing embodiments.

In some embodiments, the terminal 1200 may optionally include: a peripheral interface 1203 and at least one peripheral. The processor 1201, the memory 1202, and the peripheral interface 1203 may be connected through a bus or a signal cable. Each peripheral may be connected to the peripheral interface 1203 through a bus, a signal cable, or a circuit board. Specifically, the peripheral includes: at least one of a radio frequency (RF) circuit 1204, a display screen 1205, a camera component 1206, an audio circuit 1207, a positioning component 1208, and a power supply 1209.

The peripheral interface 1203 may be configured to connect the at least one peripheral related to input/output (I/O) to the processor 1201 and the memory 1202. In some embodiments, the processor 1201, the memory 1202, and the peripheral interface 1203 are integrated on the same chip or circuit board. In some other embodiments, any one or two of the processors 1201, the memory 1202, and the peripheral interface 1203 may be implemented on a separate chip or circuit board. This is not limited in this embodiment.

The RF circuit 1204 is configured to receive and transmit an RF signal, also referred to as an electromagnetic signal. The radio frequency circuit 1204 communicates with a communication network and other communication devices through the electromagnetic signal. The radio frequency circuit 1204 converts an electrical signal into an electromagnetic signal for transmission, or converts a received electromagnetic signal into an electrical signal. Optionally, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with another terminal by using at least one wireless communication protocol. The wireless communication protocol includes, but is not limited to, a metropolitan area network, different generations of mobile communication networks (2G, 3G, 4G, and 5G), a wireless local area network, and/or a wireless fidelity (Wi-Fi) network. In some embodiments, the RF circuit 1204 may also include a circuit related to near field communication (NFC). This is not limited in the present disclosure.

The display screen 1205 is configured to display a UI. The UI may include a graph, text, an icon, a video, and any combination thereof. When the display screen 1205 is a touch display screen, the display screen 1205 also has the capability to collect a touch signal on or above a surface of the display screen 1205. The touch signal may be inputted into the processor 1201 as a control signal for processing. In this case, the display screen 1205 may be further configured to provide a virtual button and/or a virtual keyboard, also referred to as a soft button and/or a soft keyboard. In some embodiments, there may be one display screen 1205, disposed on a front panel of the terminal 1200. In some other embodiments, there may be at least two display screens 1205, respectively disposed on different surfaces of the terminal 1200 or designed in a foldable shape. In still some other embodiments, the display screen 1205 may be a flexible display screen, disposed on a curved surface or a folded surface of the terminal 1200. Even, the display screen 1205 may be further set to have a non-rectangular irregular graph, that is, a special-shaped screen. The display screen 1205 may be manufactured by using a material such as a liquid crystal display (LCD), an organic light-emitting diode (OLED), or the like.

The camera component 1206 is configured to capture an image or a video. Optionally, the camera component 1206 includes a front-facing camera and a rear-facing camera. Generally, the front-facing camera is disposed on the front panel of the terminal, and the rear-facing camera is disposed on a back surface of the terminal. In some embodiments, there are at least two rear-facing cameras, each being any one of a main camera, a depth of field camera, a wide-angle camera, and a telephoto camera, to implement a background blurring function through fusion of the main camera and the depth of field camera, panoramic photo shooting and virtual reality (VR) shooting functions through fusion of the main camera and wide-angle camera, or another fusion shooting function. In some embodiments, the camera assembly 1206 may further include a flashlight. The flashlight may be a single-color-temperature flashlight or a dual-color-temperature flashlight. The dual-color-temperature flashlight is a combination of a warm flashlight and a cold flashlight, which may be used for light compensation at different color temperatures.

The audio circuit 1207 may include a microphone and a speaker. The microphone is configured to collect sound waves of a user and an environment, and convert the sound waves into electric signals and input the electric signals into the processor 1201 for processing, or input the electric signals into the RF circuit 1204 to implement speech communication. For the purpose of stereo collection or noise reduction, there may be a plurality of microphones, disposed at different portions of the terminal 1200 respectively. The microphone may be further an array microphone or an omni-directional collection type microphone. The speaker is configured to convert electric signals from the processor 1201 or the RF circuit 1204 into sound waves. The speaker may be a conventional thin-film speaker or a piezoelectric ceramic speaker. When the speaker is the piezoelectric ceramic speaker, electric signals not only may be converted into sound waves that can be heard by human, but also may be converted into sound waves that cannot be heard by human for ranging and the like. In some embodiments, the audio circuit 1207 may also include an earphone jack.

The positioning component 1208 is configured to position a current geographic location of the terminal 1200 for implementing navigation or a location-based service (LBS). The positioning component 1208 may be a positioning component based on the global positioning system (GPS) of the United States, the COMPASS System of China, the GLONASS System of Russia, or the GALILEO System of the European Union.

The power supply 1209 is configured to supply power to components in the terminal 1200. The power supply 1209 may be an alternating current, a direct current, a disposable battery, or a rechargeable battery. When the power supply 1209 includes the rechargeable battery, the rechargeable battery may be a wired rechargeable battery or a wireless rechargeable battery. The rechargeable battery may be further configured to support a fast charge technology.

In some embodiments, the terminal 1200 may further include one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The acceleration sensor 1211 may detect a magnitude of acceleration on three coordinate axes of a coordinate system established with the terminal 1200. For example, the acceleration sensor 1211 may be configured to detect components of gravity acceleration on the three coordinate axes. The processor 1201 may control, according to a gravity acceleration signal collected by the acceleration sensor 1211, the touch display screen 1205 to display the UI in a frame view or a portrait view. The acceleration sensor 1211 may be further configured to collect motion data of a game or a user.

The gyroscope sensor 1212 may detect a body direction and a rotation angle of the terminal 1200. The gyroscope sensor 1212 may cooperate with the acceleration sensor 1211 to collect a 3D action by the user on the terminal 1200. The processor 1201 may implement the following functions according to data collected by the gyroscope sensor 1212: motion sensing (for example, the UI is changed according to a tilt operation of the user), image stabilization during shooting, game control, and inertial navigation.

The pressure sensor 1213 may be disposed on a side frame of the terminal 1200 and/or a lower layer of the touch display screen 1205. When the pressure sensor 1213 is disposed at the side frame of the terminal 1200, a holding signal of the user on the terminal 1200 may be detected. The processor 1201 performs left and right hand recognition or a quick operation according to the holding signal collected by the pressure sensor 1213. When the pressure sensor 1213 is disposed at the lower layer of the touch display screen 1205, the processor 1201 controls, according to a pressure operation of the user on the touch display screen 1205, an operable control on the UI. The operable control includes at least one of a button control, a scroll-bar control, an icon control, and a menu control.

The fingerprint sensor 1214 is configured to collect a fingerprint of the user. The processor 1201 identifies an identity of the user according to the fingerprint collected by the fingerprint sensor 1214, or the fingerprint sensor 1214 identifies an identity of the user according to the collected fingerprint. When identifying that the user's identity is a trusted identity, the processor 1201 authorizes the user to perform related sensitive operations. The sensitive operations include: unlocking a screen, viewing encrypted information, downloading software, paying, changing a setting, and the like. The fingerprint sensor 1214 may be disposed on a front face, a back face, or a side face of the terminal 1200. When a physical button or a vendor logo is disposed on the terminal 1200, the fingerprint 1214 may be integrated with the physical button or the vendor logo.

The optical sensor 1215 is configured to collect ambient light intensity. In an embodiment, the processor 1201 may control display luminance of the touch display screen 1205 according to the ambient light intensity collected by the optical sensor 1215. Specifically, when the ambient light intensity is relatively high, the display luminance of the touch display screen 1205 is increased. When the ambient light intensity is relatively low, the display luminance of the touch display screen 1205 is reduced. In another embodiment, the processor 1201 may further dynamically adjust a shooting parameter of the camera component 1206 according to the ambient light intensity collected by the optical sensor 1215.

The proximity sensor 1216, also referred to as a distance sensor, is usually disposed on a front panel of the terminal 1200. The proximity sensor 1216 is configured to collect a distance between the user and the front surface of the terminal 1200. In an embodiment, when the proximity sensor 1216 detects that the distance between the user and the front surface of the terminal 1200 gradually becomes smaller, the touchscreen 1205 is controlled by the processor 1201 to switch from a screen-on state to a screen-off state. When the proximity sensor 1216 detects that the distance between the user and the front surface of the terminal 1200 gradually becomes larger, the touchscreen 1205 is controlled by the processor 1201 to switch from the screen-off state to the screen-on state.

A person skilled in the art may understand that the structure shown in FIG. 12 constitutes no limitation on the terminal 1200, and the terminal may include more or fewer components than those shown in the figure, or some components may be combined, or a different component deployment may be used.

In an exemplary embodiment, a computer-readable storage medium, for example, a memory including instructions, is further provided. The instructions may be executed by the processor in the terminal to implement the control information processing method in the foregoing embodiment. For example, the computer-readable storage medium may be a ROM, a random access memory (RAM), a CD-ROM, a magnetic tape, a floppy disk, an optical data storage device, or the like.

A person of ordinary skill in the art can understand that all or some of steps in the foregoing embodiments can be implemented by hardware, or completed by a program instructing relevant hardware. The program can be stored in a computer-readable storage medium. The storage medium mentioned above can be a read-only memory, a magnetic disk or an optical disk and the like.

The foregoing descriptions are merely preferred embodiments of the present disclosure, and are not intended to limit the present disclosure. Any modification, equivalent replacement, improvement, and the like made within the spirit and principle of the present disclosure shall fall within the protection scope of the present disclosure.

What is claimed is:

1. A control information processing method, applicable to a first device, the method comprising:
   simulating a controller on the first device based on a target drive file of the first device including;
      transmitting a device addition instruction to the target drive file, the device addition instruction being used for instructing to add a controller in an operating system of the first device; and
      adding, based on device addition logic in the target drive file and device information carried by the device addition instruction, the controller corresponding to the device information in the operating system of the first device;
   receiving control information transmitted by a second device, the control information being used for controlling the first device to perform a corresponding operation;
   storing the control information as input information of the controller into a storage space of the target drive file; and
   obtaining the control information from the storage space of the target drive file in response to receiving a data read instruction that instructs to obtain the input information of the controller.

2. The method according to claim 1, wherein a plurality of pieces of control information are received from the second device and stored in the target drive file, and the obtaining the control information from the storage space of the target drive file in response to receiving a data read instruction comprises:
   sequentially reading each piece of the control information from the storage space of the target drive file according to storage information of the plurality of pieces of control information in response to receiving the data read instruction.

3. The method according to claim 1, wherein the obtaining the control information from the storage space of the target drive file in response to receiving a data read instruction comprises:
   transmitting the data read instruction to an input device driver manager of the first device, the input device driver manager being configured to return the input information of the controller; and
   reading the control information in the storage space of the target drive file through the input device driver manager according to the data read instruction.

4. The method according to claim 1, wherein before the receiving control information transmitted by a second device, the method further comprises:
   establishing a connection to the second device when a connection request from the second device is received; and
   collecting first multimedia data displayed on the first device, and transmitting the first multimedia data to the second device.

5. The method according to claim 1, wherein the receiving control information transmitted by a second device comprises:
receiving control information corresponding to a triggered operation control among a plurality of operation controls displayed on the second device.

6. The method according to claim 1, wherein the device information includes configuration description information of the controller, the configuration description information being used for indicating that the controller is a human interface device (HID).

7. The method according to claim 1, wherein the device information is configured in a configuration file of a game management application, and wherein the transmitting a device addition instruction to the target drive file is based on an execution logic of the game management application.

8. The method according to claim 7, wherein the device information includes a device identifier of the controller supported by the game management application.

9. The method according to claim 1, wherein the adding, based on device addition logic in the target drive file and device information carried by the device addition instruction, the controller corresponding to the device information in the operating system of the first device comprises:
invoking a device addition interface of the first device according to the device addition instruction, and adding the controller corresponding to the device information in the operating system of the first device;
transmitting the device information and a storage format of input information of the controller to a device manager of the first device; and
transmitting a notification message to an input device driver manager of the first device, the notification message being used for notifying that the controller is added in the operating system of the first device.

10. The method according to claim 9, wherein the storing the control information as input information of the controller into a storage space of the target drive file comprises:
transmitting a storage instruction to the target drive file, the storage instruction being used for instructing to store the control information as the input information of the controller; and
executing storage logic in the target drive file according to the control information carried by the storage instruction, the storage logic being used for indicating a storage process of the input information of the controller.

11. The method according to claim 10, wherein the executing storage logic in the target drive file according to control information carried by the storage instruction comprises:
storing the control information into the storage space of the target drive file according to the storage format of the input information of the controller.

12. An electronic device, comprising a processor and a memory, the memory storing computer-readable instructions, the computer-readable instructions, when executed by the processor, causing the processor to perform a plurality of operations including:
simulating a controller on the first device based on a target drive file of the first device including:
transmitting a device addition instruction to the target drive file, the device addition instruction being used for instructing to add a controller in an operating system of the first device; and
adding, based on device addition logic in the target drive file and device information carried by the device addition instruction, the controller corresponding to the device information in the operating system of the first device;
receiving control information transmitted by a second device, the control information being used for controlling the first device to perform a corresponding operation;
storing the control information as input information of the controller into a storage space of the target drive file; and
obtaining the control information from the storage space of the target drive file in response to receiving a data read instruction that instructs to obtain the input information of the controller.

13. The device according to claim 12, wherein a plurality of pieces of control information are received from the second device and stored in the target drive file, and the obtaining the control information from the storage space of the target drive file in response to receiving a data read instruction comprises:
sequentially reading each piece of the control information from the storage space of the target drive file according to storage information of the plurality of pieces of control information in response to receiving the data read instruction.

14. The device according to claim 12, wherein the obtaining the control information from the storage space of the target drive file in response to receiving a data read instruction comprises:
transmitting the data read instruction to an input device driver manager of the first device, the input device driver manager being configured to return the input information of the controller; and
reading the control information in the storage space of the target drive file through the input device driver manager according to the data read instruction.

15. The device according to claim 12, wherein before the receiving control information transmitted by a second device, the plurality of operations further comprises:
establishing a connection to the second device when a connection request from the second device is received; and
collecting first multimedia data displayed on the first device, and transmitting the first multimedia data to the second device.

16. The device according to claim 12, wherein the receiving control information transmitted by a second device comprises:
receiving control information corresponding to a triggered operation control among a plurality of operation controls displayed on the second device.

17. The device according to claim 12, wherein the adding, based on device addition logic in the target drive file and device information carried by the device addition instruction, the controller corresponding to the device information in the operating system of the first device comprises:
invoking a device addition interface of the first device according to the device addition instruction, and adding the controller corresponding to the device information in the operating system of the first device;
transmitting the device information and a storage format of input information of the controller to a device manager of the first device; and
transmitting a notification message to an input device driver manager of the first device, the notification message being used for notifying that the controller is added in the operating system of the first device.

18. The device according to claim 17, wherein the storing the control information as input information of the controller into a storage space of the target drive file comprises:
  transmitting a storage instruction to the target drive file, the storage instruction being used for instructing to store the control information as the input information of the controller; and
  executing storage logic in the target drive file according to the control information carried by the storage instruction, the storage logic being used for indicating a storage process of the input information of the controller.

19. The device according to claim 18, wherein the executing storage logic in the target drive file according to control information carried by the storage instruction comprises:
  storing the control information into the storage space of the target drive file according to the storage format of the input information of the controller.

20. A non-transitory storage medium storing computer-readable instructions, the computer-readable instructions, when executed by one or more processors, causing the one or more processors to perform a plurality of operations comprising:
  simulating a controller on the first device based on a target drive file of the first device including;
    transmitting a device addition instruction to the target drive file, the device addition instruction being used for instructing to add a controller in an operating system of the first device; and
    adding, based on device addition logic in the target drive file and device information carried by the device addition instruction, the controller corresponding to the device information in the operating system of the first device;
  receiving control information transmitted by a second device, the control information being used for controlling the first device to perform a corresponding operation;
  storing the control information as input information of the controller into a storage space of the target drive file; and
  obtaining the control information from the storage space of the target drive file in response to receiving a data read instruction that instructs to obtain the input information of the controller.

* * * * *